(12) United States Patent
Fukuda et al.

(10) Patent No.: US 6,744,168 B2
(45) Date of Patent: Jun. 1, 2004

(54) STATOR AND STATOR MANUFACTURING METHOD

(75) Inventors: Takeo Fukuda, Haga-gun (JP); Takeo Arai, Fujimi (JP); Hirofumi Atarashi, Shioya-gun (JP); Mitsuyoshi Takao, Shioya-gun (JP); Toshinori Tsukamoto, Shioya-gun (JP); Hiroyuki Kikuchi, Shioya-gun (JP); Yasuhiro Endo, Utsunomiya (JP); Kaoru Noji, Date-gun (JP); Takahiro Sato, Date-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/321,536

(22) Filed: Dec. 18, 2002

(65) Prior Publication Data

US 2003/0117034 A1 Jun. 26, 2003

(30) Foreign Application Priority Data

Dec. 25, 2001 (JP) ........................................ 2001/391891

(51) Int. Cl.[7] .................................................. H02K 3/34
(52) U.S. Cl. .......................... 310/215; 310/42; 310/254; 29/596; 29/734
(58) Field of Search .......................... 310/215, 42, 254, 310/179, 180, 184, 185, 214, 192, 194, 216, 218; 29/596, 734

(56) References Cited

U.S. PATENT DOCUMENTS

| | | | | |
|---|---|---|---|---|
| 5,095,610 A | * | 3/1992 | Schultz et al. | ................. 29/596 |
| 5,533,252 A | * | 7/1996 | Kawamura | .................... 29/734 |
| 6,065,204 A | * | 5/2000 | DeHart | ......................... 29/734 |

FOREIGN PATENT DOCUMENTS

| | | | | |
|---|---|---|---|---|
| JP | 5-236682 | * | 9/1993 | ............ H02K/1/16 |
| JP | 6-237545 | * | 8/1994 | ............ H02K/1/16 |

* cited by examiner

*Primary Examiner*—Burton Mullins
(74) *Attorney, Agent, or Firm*—Armstrong, Kratz, Quintos, Hanson & Brooks, LLP

(57) ABSTRACT

A stator and a stator manufacturing method is provided in which a space factor can be improved, while reducing the number of components and simplifying the manufacturing process. A stator comprises a plurality of teeth cores 11 positioned at predetermined intervals on a predetermined circumference, a core back core 12 provided on a circumferential outside between adjacent teeth cores, and stator windings 13 which are wound around the teeth cores. An approximately U-shaped insulating sheet 14 is provided between adjacent teeth cores 11 with the ends of the sheet facing towards the circumferential outside, the insulating sheet 14 is provided between the teeth cores 11 and the stator windings 13, and the ends of the insulating sheet 14 are bent inward and occluded by an inner end surface of the core back core 12 which is inserted from the circumferential outside.

4 Claims, 9 Drawing Sheets

STATOR AND STATOR MANUFACTURING METHOD

BACKGROUND OF THE INVENTION

1. Field of the Invention

The present invention relates to a stator for use in rotary electric machines such as electric motors and generators, and a stator manufacturing method.

2. Description of the Related Art

Conventionally, stators 1 for use in rotary electric machines such as electric motors and generators include those comprising a stator core 2 as shown in the plan view of FIG. 11. The stator core 2 comprises a core back core 3 formed in an approximately annular shape, and a plurality of teeth cores 4 disposed radially on the core back core 3. Stator winding 6 are wound around the side surfaces of these teeth cores 4 to form the stator 1.

However, in order to prevent excess current from flowing through the teeth cores 4, it is necessary to ensure insulation between the stator windings 6 and the teeth cores 4. Consequently, insulation between the stator windings 6 and the teeth cores 4 is conventionally ensured by providing insulating sheets 7 and 8 such as those shown in FIGS. 12A to 12D, for example.

Specifically, first, the approximately U-shaped insulating sheet 7 is disposed so as to cover the side surfaces of adjacent teeth cores 4 and the inner surface of the core back core 3 (see FIGS. 12A and 12B). Next, the stator windings 6 are wound on the teeth cores 4, the side surfaces of which are covered by the insulating sheet 7 (see FIG. 12C). The approximately flat insulating sheet 8 is then inserted into a slot 5 between the adjacent teeth cores 4 and fitted tightly against the approximately U-shaped insulating sheet 7, thereby sealing the stator windings 6 within the slot 5 (see FIG. 12D). By employing such a construction, insulation between the stator windings 6 and the teeth cores 4 can be ensured. To ensure that the approximately flat insulating sheet 8 is capable of this sealing action, the insulating sheet 8 has a greater thickness than the approximately U-shaped insulating sheet 7.

However, in the related art described above, because the winding of the stator windings and the positioning of the insulating sheets are performed inside the locations of the teeth cores, work space for the equipment (not shown in the figure) which performs the winding or positioning must be made available on the inside of the positioning sites. Consequently, a problem occurs in that the extent to which the stator windings can be wound on the teeth cores is restricted by the space required by this equipment, and the space factor is reduced accordingly.

In addition, in the related art described above, the use of two different types of insulating sheets, which differ in shape and thickness within each of the slots between adjacent teeth cores is problematic in that the number of components increases. Furthermore, because the assembly of the two types of insulating sheet must be performed in separate processes, the manufacturing process becomes complicated.

SUMMARY OF THE INVENTION

In accordance with these circumstances, an object of the present invention is to provide a stator and a stator manufacturing method in which the space factor can be improved, while reducing the number of components and simplifying the manufacturing process.

In order to resolve the problems described above, a first aspect of the present invention provides a stator (for example, a stator 10 of the embodiment) comprising a plurality of teeth cores (for example, teeth cores 11 of the embodiment) positioned at predetermined intervals on a predetermined circumference, a core back core (for example, a core back core 12 of the embodiment) provided on a circumferential outside between adjacent teeth cores, and stator windings (for example, stator windings 13 of the embodiment) which are wound around the teeth cores, wherein an approximately U-shaped insulating sheet (for example, an insulating sheet 14 of the embodiment) is provided between adjacent teeth cores with the ends of the sheet facing towards the circumferential outside, the insulating sheet is provided between the teeth cores and the stator windings, and the ends of the insulating sheet are bent inward and sealed off by an inner end surface of the core back core which is inserted from the circumferential outside.

By employing the above construction, it is possible to position the insulating sheet from the circumferential outside, once the plurality of teeth cores have been positioned on the predetermined circumference. Consequently, the operation of positioning the insulating sheet can be performed from the circumferential outside, and it is consequently no longer necessary to reserve space for performing the positioning operation on the circumferential inside. Furthermore, in a similar manner, the core back core can be inserted between and connected with the adjacent teeth cores from the circumferential outside, and consequently it is not necessary to reserve space on the circumferential inside for the core back core connection operation. Accordingly, because the space between the teeth cores for winding the stator windings can be increased, the space factor can be improved.

Furthermore, because the approximately U-shaped insulating sheet is provided in each slot between adjacent teeth cores, and the ends of the insulating sheet are bent inward and sealed off by the inner end surface of the core back core, it is possible to ensure insulation between the stator windings and the teeth cores using a single insulating sheet for each slot. Consequently, the number of components can be reduced when compared with conventional examples because the number of insulating sheets is reduced by half. Moreover because the operation of inserting the core back core and the operation of sealing off the insulating sheet can be performed simultaneously, the manufacturing process can be simplified.

A second aspect of the present invention is a stator wherein there is provided a bending section (for example, a bending section 15 in the embodiment) formed by bending an end of the U-shaped insulating sheet inward between the teeth cores. By employing the above construction, the ends of the approximately U-shaped insulating sheet are reliably bent and sealed off when the core back core is inserted, and consequently the formability can be improved.

A third aspect of the present invention is a stator wherein a guide recess (for example, a guide recess 16 of the embodiment) which guides the ends of the insulating sheet is provided on an inner end surface of the core back core.

By employing the above construction, the ends of the approximately U-shaped insulating sheet are guided and bent inwards by the guide recess when the core back core is inserted, and are more reliably sealed off, and consequently the formability can be even further improved.

A fourth aspect of the present invention is a stator manufacturing method wherein by positioning a plurality of teeth cores at predetermined intervals on a predetermined circumference, providing an approximately U-shaped insulating sheet between adjacent teeth coreso that the ends thereof are facing towards a circumferential outside, windingtator winding around the teeth cores on which the approximately U-shaped insulating sheet is provided, and inserting a core back core between adjacent teeth cores from the circumferential outside, both ends of the approximately U-shaped insulating sheet are bent over and sealed off.

By employing the above construction, the space factor can be improved, the number of components can be kept to a minimum, and the manufacturing process can be simplified.

DETAILED DESCRIPTION OF THE INVENTION

As follows is a description of a stator and a stator manufacturing method of an embodiment of the present invention, with reference to the drawings.

Figure 1:
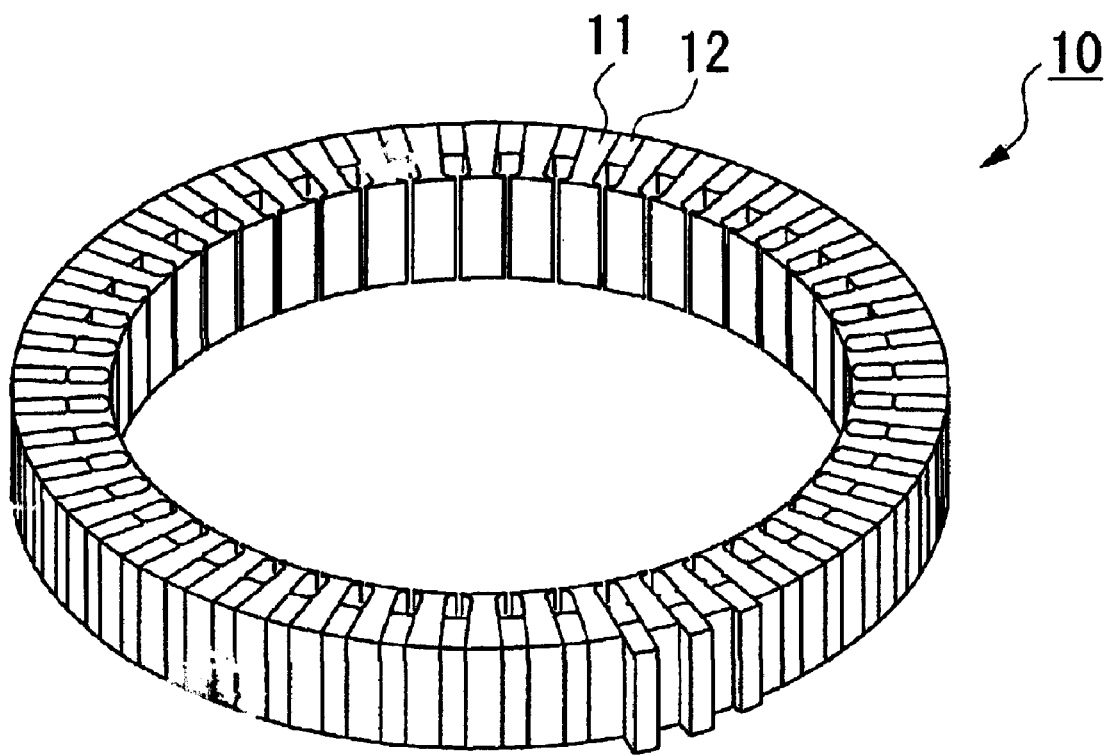
FIG. 1 is a perspective view showing a stator according to an embodiment of the present invention.

FIG. 1 is a perspective view showing the stator of the embodiment of the present invention. As shown in FIG. 1, a stator 10 according to the present embodiment is formed in an approximately circular cylindrical shape, and comprises a plurality of teeth cores 11 positioned radially at predetermined intervals on a predetermined circumference, and core back core 12 positioned between adjacent teeth cores 11.

Figure 2A:
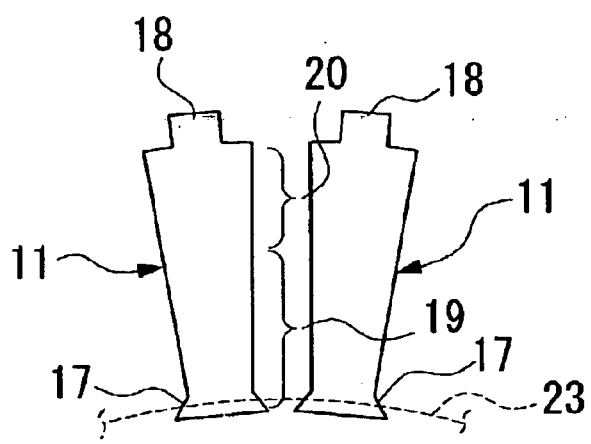
FIGS. 2A, 2B, and 2C are process drawings showing a stator manufacturing method according to an embodiment of the present invention.

FIG. 2A shows a cross-sectional view of the teeth cores 11 seen from the axial direction of the circumference. As shown in this figure, the teeth cores 11 comprise a winding section 19 on the circumferential inside and a yoke section 20 on the circumferential outside which have a predetermined thickness in a direction parallel to the central axis of the stator 10.

The winding section 19 is formed so as to have a predetermined width in the circumferential direction, and engagement sections 17 which project outward in the circumferential direction are provided at the inner circumferential end of the winding section 19. The two opposing engagement sections 17 between adjacent teeth cores 11 are able to contact the inner end surface of the insulating sheet 14 which is inserted between the teeth cores 11, thereby preventing the insulating sheet 14 from falling radially inwards.

The yoke section 20 is formed so as to increase in circumferential width from the inner circumferential side towards the outer circumferential side, so that for example the sides of the yoke section are tapered. In other words, the distance between the two sides of a yoke section is set to gradually increase from the inner circumferential side towards the outer circumferential side. The distance between opposing sides of adjacent yoke sections which oppose one another between adjacent teeth cores 11 arranged at predetermined intervals on the predetermined circumference is either set to a predetermined value from the inner circumferential side to the outer circumferential side, or alternatively set to a value which decreases slightly from the inner circumferential side towards the outer circumferential side. Projections 18 which project outwards in a radial direction are formed in the centers of the outer circumferential surfaces of the teeth cores 11. Furthermore, the teeth cores 11 are formed by laminating a directional electromagnetic steel sheet metal such as silicon steel sheets, wherein the direction of easy magnetization is set to the radial direction of the stator, for example.

Figure 3B:
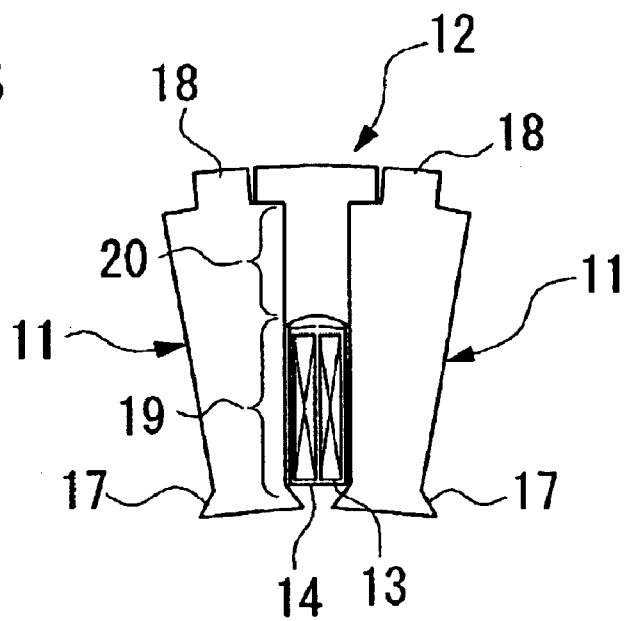
Figure 4:
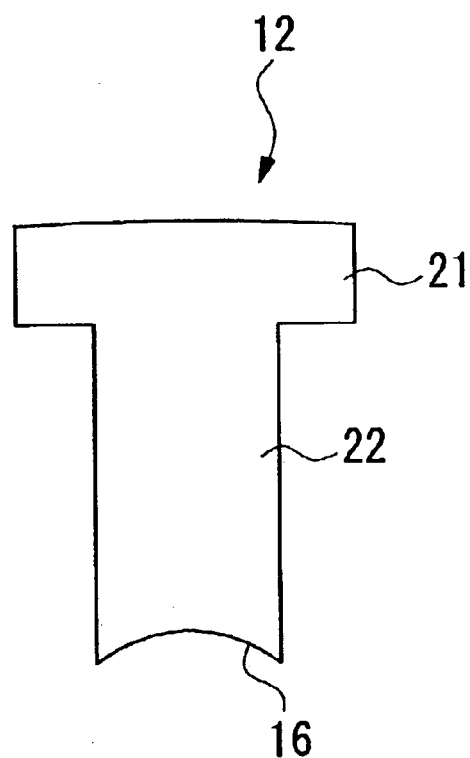
FIG. 4 is a cross-sectional view showing a core back core of the stator shown in FIG. 1.

FIG. 4 shows a cross-sectional view of the core back core 12. As shown in the diagram, the core back core 12 is approximately T shaped when viewed from the circumferential direction, and comprises a head section 21 on an outer circumferential end which projects towards the circumferential outside, and an axial section 22 on an inner circumferential side. The head section 21 of the core back core 12 is formed so that the width in the circumferential direction is equal to the distance between the opposing sides of adjacent projections 18 which oppose one another between adjacent teeth cores 11. The width of the axial section 22 is set to the same value as the distance between the opposing sides of adjacent yoke sections which oppose one another between adjacent teeth cores 11, or to a value slightly greater than this distance. The axial section 22 is fixed and sandwiched between the adjacent teeth cores 11 (see FIG. 3B). The core back core 12 is formed for example to an equal thickness to the teeth cores 11.

A guide recess 16, which reduces in height from the edges which contact the side surfaces of the teeth cores 11 towards the center, is formed on the inner circumferential end surface of the core back core 12. The ends of the insulating sheet 14 are bent by this guide recess 16 to seal off the insulating sheet 14. This process is described in detail below.

Furthermore, the core back core 12 is formed in an approximately rectangular shape by laminating a directional electromagnetic steel sheet metal such as silicon steel sheet, wherein the direction of easy magnetization is set to the circumferential direction of the stator, for example.

Figure 5:
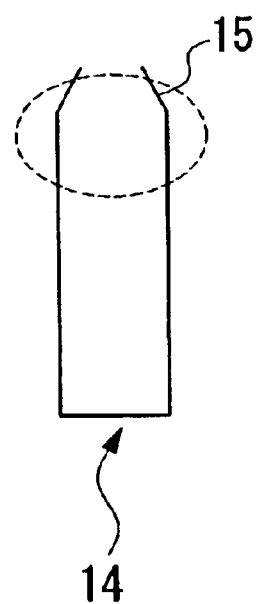
FIG. 5 is a cross-sectional view of an insulating sheet shown in FIG. 2.

FIG. 5 is a cross-sectional view showing an insulating sheet 14 of the present embodiment. As shown in the figure, the insulating sheet 14 is approximately U-shaped, and bending sections 15 which have been bent so that the ends face each other are formed at both ends of the insulating sheet. The insulating sheet 14 is positioned between adjacent teeth cores 11 in a bent and sealed off state, with the bottom surface contacting the engagement sections 17 of the adjacent teeth cores 11, both of the sides contacting the winding section 19 of the teeth cores 11, and both ends contacting the guide recess 16 of the core back core 12. The stator windingss 13, which are wound around the sides of the teeth cores 11 are inserted into the approximately rectangular space formed inside the insulating sheet 14. The width of the U-shaped insulating sheet 14 is a few millimeters larger than the circumferential width of the core back core 12 or the teeth cores 11.

Next, the manufacturing method of this stator 10 is described with reference to FIGS. 2A, 2B and 2C and FIGS. 3A and 3B.

Figure 2B:
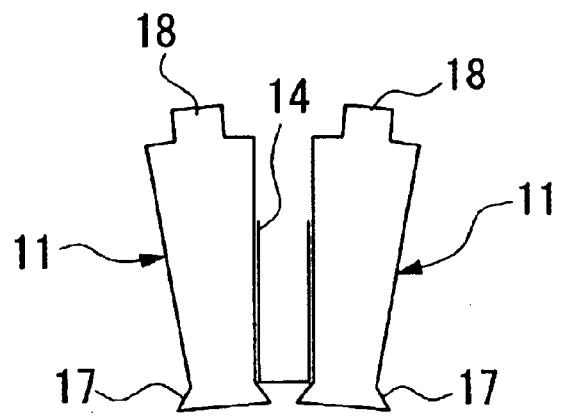

First, as shown in FIG. 2A, a plurality of teeth cores 11 are positioned at predetermined intervals on an outer circumferential surface of an approximately circular cylindrical teeth fixing jig 23. At this time, an approximately T shaped space is formed between adjacent teeth cores 11. Next, as shown in FIG. 2B, an approximately U-shaped insulating sheet 14 with an end facing outward, is inserted between the winding sections 19 of the teeth cores 11 which are fixed to the teeth fixing jig 23. At this time, because the bottom surface of the insulating sheet 14 engages with the engagement sections 17 of the adjacent teeth cores 11, the insulating sheet 14 is prevented from falling radially inwards.

Figure 2C:
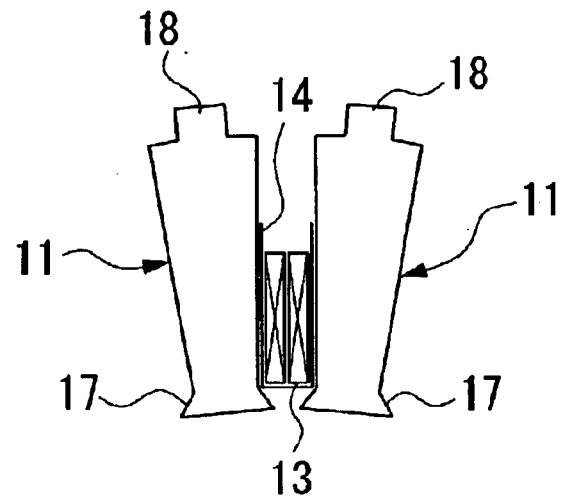

As shown in FIG. 2C, the stator windings 13 are then wound onto the winding sections 19 on the side surfaces of the teeth cores 11 by a winding device, which is not shown in the figure. The winding device is set so that in each cycle, stator windings 13 with the same phase are wound between the same teeth cores 11. For example, in the case of a three phase motor, the winding device is constructed such that a plurality of stator windings 13 corresponding with a U phase, a V phase and a W phase are supplied simultaneously in a bundled state, and the respective stator windings 13 are wound around the corresponding teeth cores 11. As described above, because the insulating sheet 14 is disposed between the side surfaces of the winding sections 19 of the teeth cores 11, the stator windings 13 are wound around the side surface of the winding section 19 over the insulating sheet 14. When winding the stator windings 13, a slight gap is left on the side of the teeth cores 11 orthogonal to the side where the insulating sheet 14 is provided, for reasons such as ensuring an even tension. As a result, the insulating sheet 14 need not be provided on these orthogonal side surfaces. Accordingly, because insulation between the stator windings 13 and the teeth cores 11 can be ensured, there is no danger of excess current flowing through the teeth cores 11.

Figure 3A:
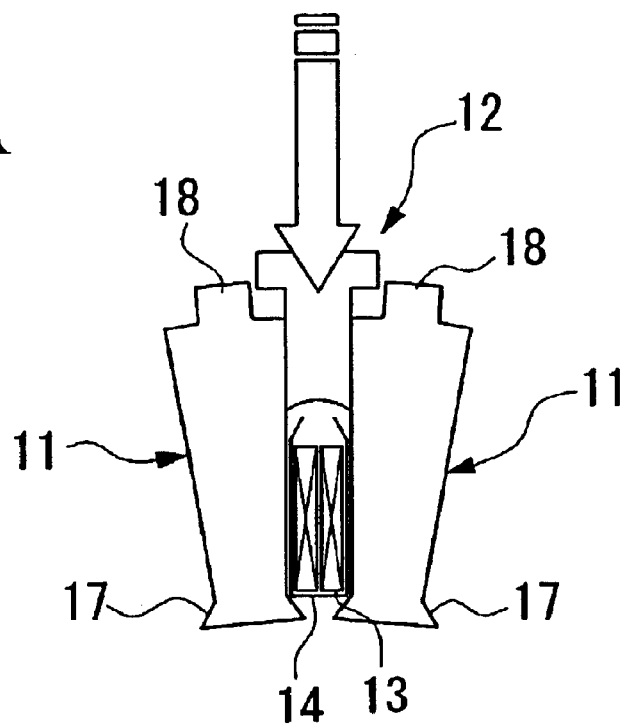
FIGS. 3A and 3B are process drawings showing a stator manufacturing method according to the embodiment of the present invention.

Subsequently, as shown in FIG. 3A, a core back core 12 is inserted between each pair of adjacent teeth cores 11 from the circumferential outside. When the core back core 12 is inserted between the teeth cores 11 in this manner, the inner end surface (a guide recess) 16 of the core back core 12 contacts the ends of the insulating sheet 14. If the core back core 12 is inserted even further, then the ends of the insulating sheet 14 are bent inwards by the inner end surface 16 of the core back core 12. As described above, because bending sections 15 are formed at the ends of the insulating sheet 14, if the insulating sheet 14 is pressed down while in contact with the inner end surface 16 of the core back core 12, then the bending sections 15 bend over easily to overlap each other. Furthermore, because the guide recess 16 is formed at the inner end surface of the core back core 12, the ends of the insulating sheet 14 are guided from the edge of the guide recess 16 to the center, while bending inwards so as to overlap each other. In this manner, the ends of the insulating sheet 14 can be reliably bent over and sealed off upon insertion of the core back core 12, thereby improving the formability.

A shown in FIG. 3B, the core back core 12 is held in a state where the side surfaces of the head section 21 of the core back core 12 press against the sides of the projections 18 on adjacent teeth cores 11, and the sides of the axial section 22 of the core back core 12 press against the yoke sections 20 of the adjacent teeth cores 11. At this time, the ends of the insulating sheet 14 are bent over by the guide recess 16 in the core back core 12, thereby sealing off the insulating sheet 14. Subsequently, the teeth fixing jig 23 is removed, to complete the series of processes.

In this manner, the process of inserting the core back core 12 and the process of sealing off the insulating sheet 14 can be performed concurrently, and consequently the manufacturing process can be simplified. Furthermore, because one insulating sheet is sufficient for each slot, the number of components can be kept to a minimum, and the cost can be reduced accordingly.

Figure 6:
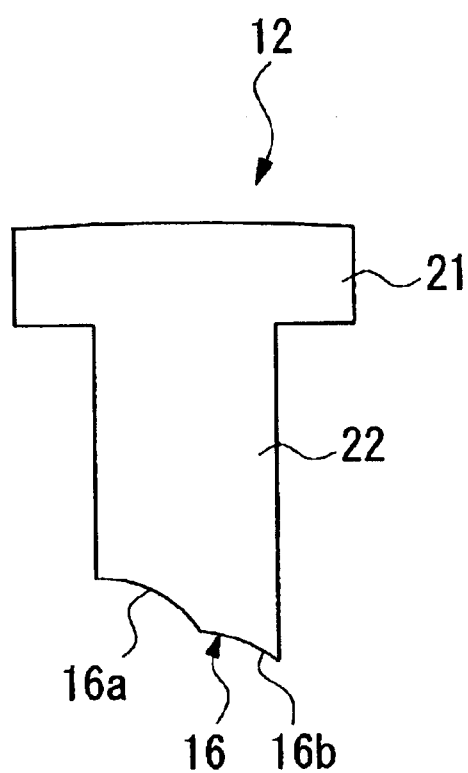
FIG. 6 is a cross-sectional view showing a modified example of the core back corehown in FIG. 1.

The guide recess 16 of the core back core 12 described above may be formed in two separate levels as a first and a second recess 16a and 16b, as shown in FIG. 6. In such a case, the bending sections 15 at the ends of the insulating sheet 14 can be reliably formed and sealed off.

Figure 7:
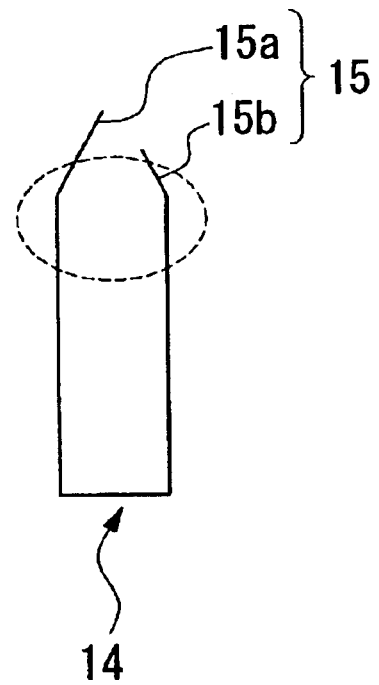
FIG. 7 is a cross-sectional view showing a modified example of the insulating sheet shown in FIG. 2.
Figure 8A:
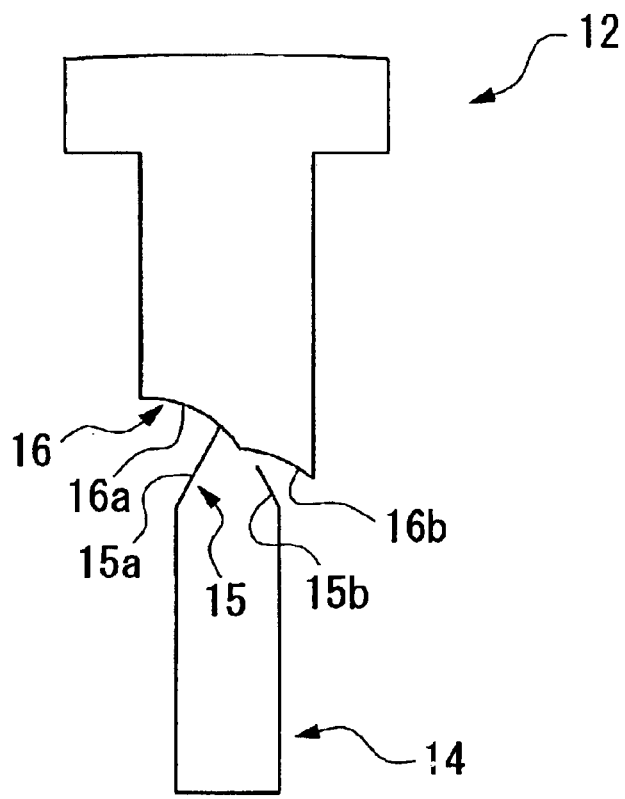
FIGS. 8A and 8B are process drawings explaining the process of sealing off the insulating sheet shown in FIG. 7 using the core back core shown in FIG. 6.
Figure 8B:
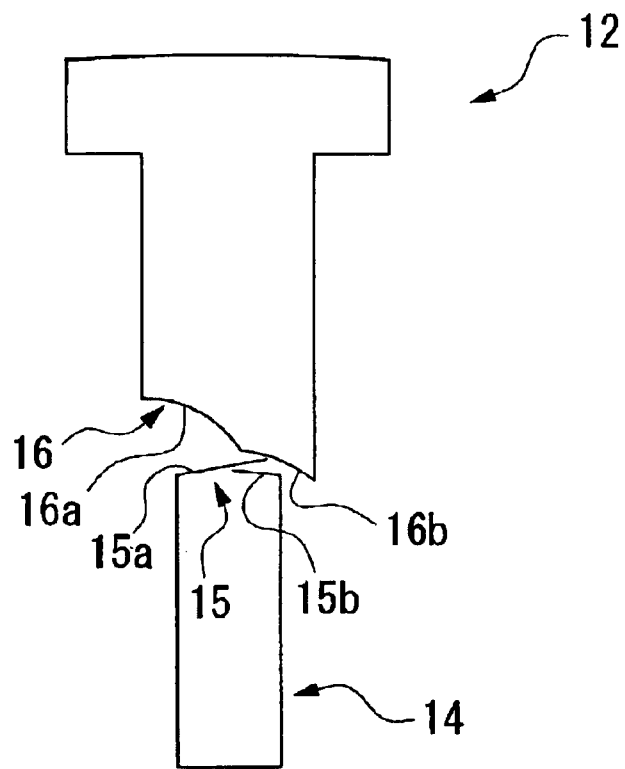

Furthermore, as shown in FIG. 7, one of the bending sections 15a of the insulating sheet 14 may be longer than the other bending section 15b. The bending of the ends of the insulating sheet 14 can also performed reliably in this case. FIGS. 8A and 8B are process drawings explaining the process (corresponding with the process shown in FIGS. 3A and 3B of sealing off the insulating sheet 14 shown in FIG. 7 using the core back core 12 shown in FIG. 6. The teeth cores 11 and the stator windings 13 have been omitted for convenience of illustration.

As shown in FIG. 8A, when the core back core 12 is moved towards the ends of the insulating sheet 14, one of the bending sections 15a of the insulating sheet 14 contacts the first recess 16a of the core back core 12 and is guided inward, and the other bending section 15b of the insulating sheet 14 contacts the second recess 16b of the core back core 12 and is also guided inward. Consequently, as shown in FIG. 8B, by moving the core back core 12 to a predetermined position, the bending sections 15a and 15b of the insulating sheet 14 overlap reliably, sealing off the insulating sheet 14.

Figure 9:
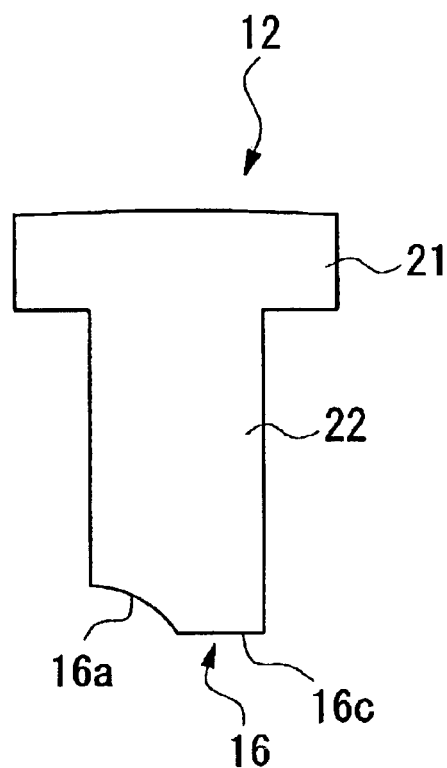
FIG. 9 is a cross-sectional view showing a modified example of the core back core shown in FIG. 1.
Figure 10:
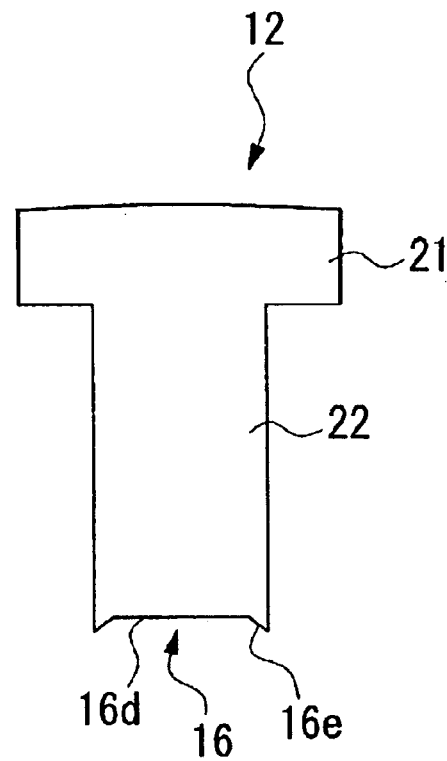
FIG. 10 is a cross-sectional view showing a modified example of the core back core shown in FIG. 1.
Figure 11:
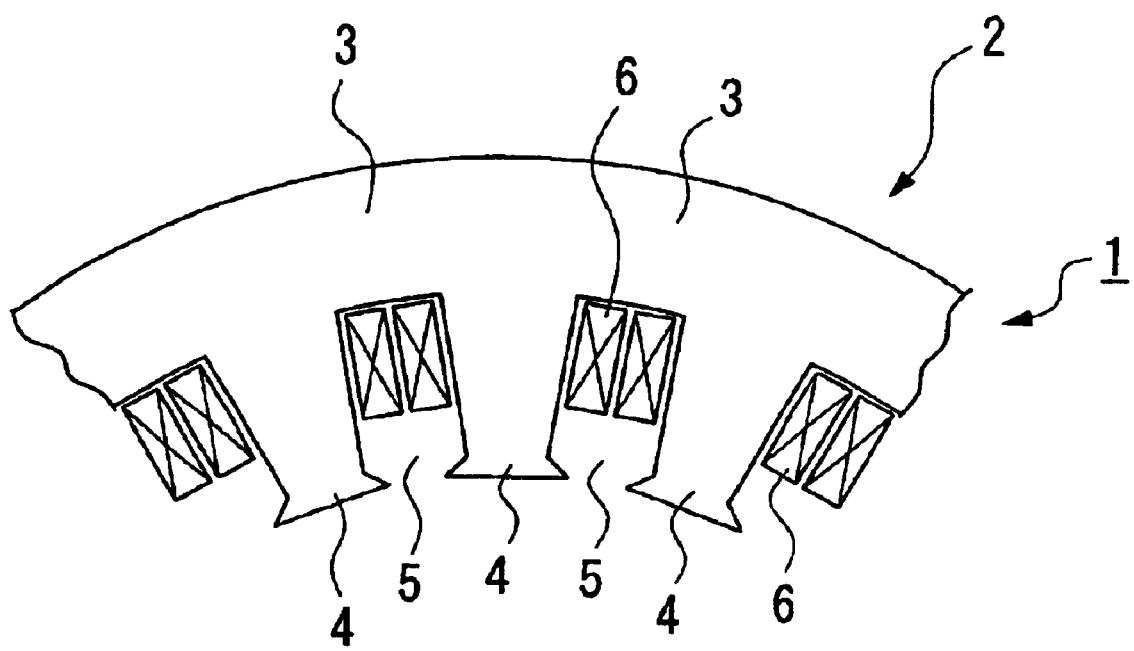
FIG. 11 is a cross-sectional view showing the main elements of a conventional stator.
Figure 12A:
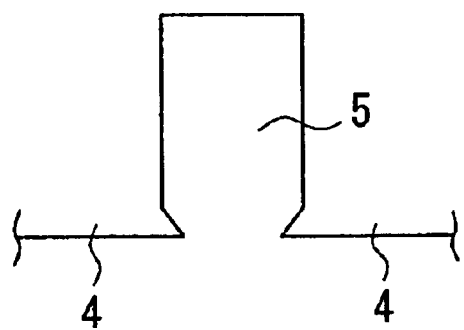
FIGS. 12A, 12B, 12C, and 12D are process drawings showing a conventional stator manufacturing method.
Figure 12B:
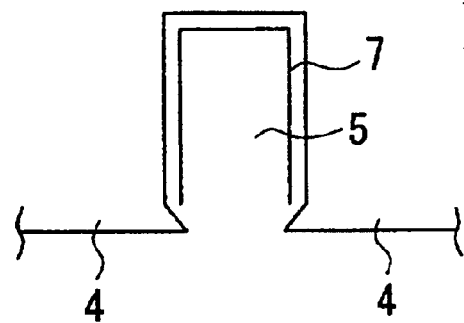
Figure 12C:
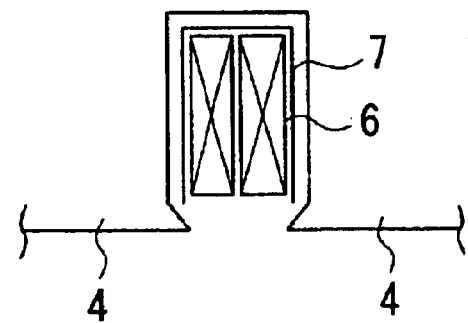
Figure 12D:
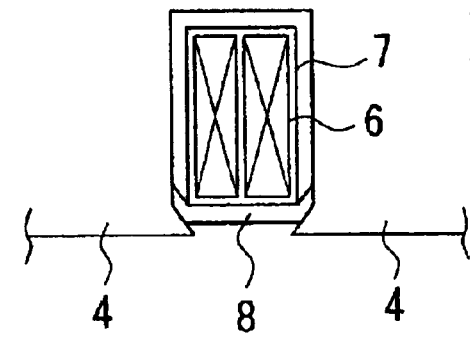

The guide recess 16 of the core back core 12 is not limited to the form described above, and as shown in FIG. 9, a construction in which only the recess 16a is formed, leaving the remaining portion as a flat surface 16c, may also be employed. Furthermore, as shown in FIG. 10, a construction in which a recess 16e is formed only at the edges of the inner end surface of the core back core 12, leaving the area inside this recess as a flat surface 16d, may also be employed. Moreover, the inner end surface of the core back core 12 may also be formed as a simple flat surface, without providing any guide recess 16 at the inner end surface.

As described above, in the present embodiment, the operation of positioning the insulating sheet 14 and the operation of connecting the core back core 12 and the like can be performed from the circumferential outside. Consequently, because it is not necessary to reserve space for performing these operations on the circumferential inside, the space for winding the stator windings 13 onto the teeth cores 11 can be increased, and the space factor can be improved.

The present invention is not limited to the embodiment described above, and may, for example, also be set up so that the distance between the side surfaces of the teeth cores 11 is a predetermined value from the inner circumferential side through to the outer circumferential side. In this case, because both sides of the core back core 12 are in surface contact with the sides of the teeth cores 11, the core back core 12 can be fixed in place by being sandwiched from both sides along the entire surface which is in surface contact with the sides of the teeth cores 11.

As described above, according to the first aspect of the present invention, because it is not necessary to reserve space on the circumferential inside, for performing the operation for positioning the insulating sheet or the operation for connecting the core back core, the space for winding the stator windings onto the teeth cores can be increased, and the space factor can be improved. Furthermore, because insulation between the stator windings and the teeth cores can be ensured using a single insulating sheet for each slot, the number of components can be reduced, and the manufacturing process can be simplified.

According to the second aspect of the present invention, the ends of the approximately U-shaped insulating sheet are bent over when the core back core is inserted, and seal off the insulating sheet, and consequently the formability can be further enhanced.

According to the third aspect of the present invention, the ends of the approximately U-shaped insulating sheet are guided and bent inwards by the guide recess when the core back core is inserted, and are more reliably sealed off, and consequently the formability can be even further improved.

According to the fourth aspect of the present invention, the space factor can be improved, the number of components can be kept to a minimum, and the manufacturing process can be simplified.

What is claimed is:

1. A stator comprising:
    a plurality of teeth cores positioned at predetermined intervals on a predetermined circumference;
    a core back core provided on a circumferential outside between adjacent teeth cores; and
    at least one stator winding which is wound around said teeth cores,
    wherein an approximately U-shaped insulating sheet is provided between adjacent teeth cores with the ends of the sheet facing towards said circumferential outside, said insulating sheet is provided between said teeth cores and said stator windings, and the ends of said insulating sheet are bent inward and occluded by an inner end surface of said core back core which is inserted from said circumferential outside; and
    wherein, between yoke sections of any of two of the teeth cores there is a respective space for accepting therein the core back core, said space comprising a generally constant distance between the two teeth cores alone a radial direction of the stator.

2. The stator according to claim 1, wherein there is provided a bending section formed by bending an end of said U-shaped insulating sheet inward between the teeth cores.

3. A stator, comprising:
    a plurality of teeth cores positioned at predetermined intervals on a predetermined circumference;
    a core back core provided on a circumferential outside between adjacent teeth cores; and
    at least one stator winding which is wound around said teeth cores,
    wherein an approximately U-shaped insulating sheet is provided between adjacent teeth cores with the ends of the sheet facing towards said circumferential outside said insulating sheet is provided between said teeth cores and said stator windings, and the ends of said insulating sheet are bent inward and occluded by an inner end surface of said core back core which is inserted from said circumferential outside; and
    wherein a guide recess which guides the ends of said insulating sheet is provided on an inner end surface of said core back core.

4. A stator manufacturing method comprising the steps of:
    arranging a plurality of teeth cores at predetermined intervals on a predetermined circumference,
    providing an approximately U-shaped insulating sheet between adjacent teeth cores so that the ends thereof are facing towards a circumferential outside,
    winding at least one stator winding around the teeth cores on which said approximately U-shaped insulating sheet is provided, and
    inserting a core back core between adjacent teeth cores from said circumferential outside so that both ends of said approximately U-shaped insulating sheet are bent over and occluded.

* * * * *